United States Patent [19]

Burland

[11] Patent Number: 6,095,828
[45] Date of Patent: Aug. 1, 2000

[54] ELECTRICAL CONNECTION AND COUPLINGS

[75] Inventor: Gregory Neil Burland, London, United Kingdom

[73] Assignee: Smiths Industries Public Limited Company, London, United Kingdom

[21] Appl. No.: 09/175,370

[22] Filed: Oct. 20, 1998

[30] Foreign Application Priority Data

Oct. 29, 1997 [GB] United Kingdom .................... 9722722

[51] Int. Cl.⁷ ...................................... H01R 4/66
[52] U.S. Cl. ............................ 439/98; 439/98; 439/575; 439/584; 439/585; 439/607; 439/610
[58] Field of Search .............................. 439/98, 610, 573, 439/575, 584, 585, 607, 799

[56] References Cited

U.S. PATENT DOCUMENTS

| | | | |
|---|---|---|---|
| 4,739,126 | 4/1988 | Gutter et al. | 174/65 |
| 4,973,262 | 11/1990 | Gerke et al. | 439/395 |
| 5,102,351 | 4/1992 | Meshel | 439/607 |
| 5,174,769 | 12/1992 | Dearman . | |
| 5,246,376 | 9/1993 | Schuhl et al. . | |
| 5,310,359 | 5/1994 | Chadbourne et al. | 439/462 |
| 5,807,138 | 9/1998 | Guiol | 439/610 |

*Primary Examiner*—Paula Bradley
*Assistant Examiner*—Truc Nguyen
*Attorney, Agent, or Firm*—Pollock, Vande Sande & Amernick

[57] ABSTRACT

An electrical coupling has a ring through which extend multiple screened wires. The ring has several longitudinally-extending integral splines projecting from its outer surface from which project a curved, circumferentially-extending spring arm on each side. The wires extend through the ring and their screening sleeves are folded over an end, contact surface of the ring and back along its outside, being retained under the spring arms. A metal cap fits over one end of the ring holding the sleeves against the contact surface and protecting them around the outside of the ring. The cap is held on the ring by a collar, which extends around its outside and screws onto a body member at the opposite end of the ring.

14 Claims, 2 Drawing Sheets

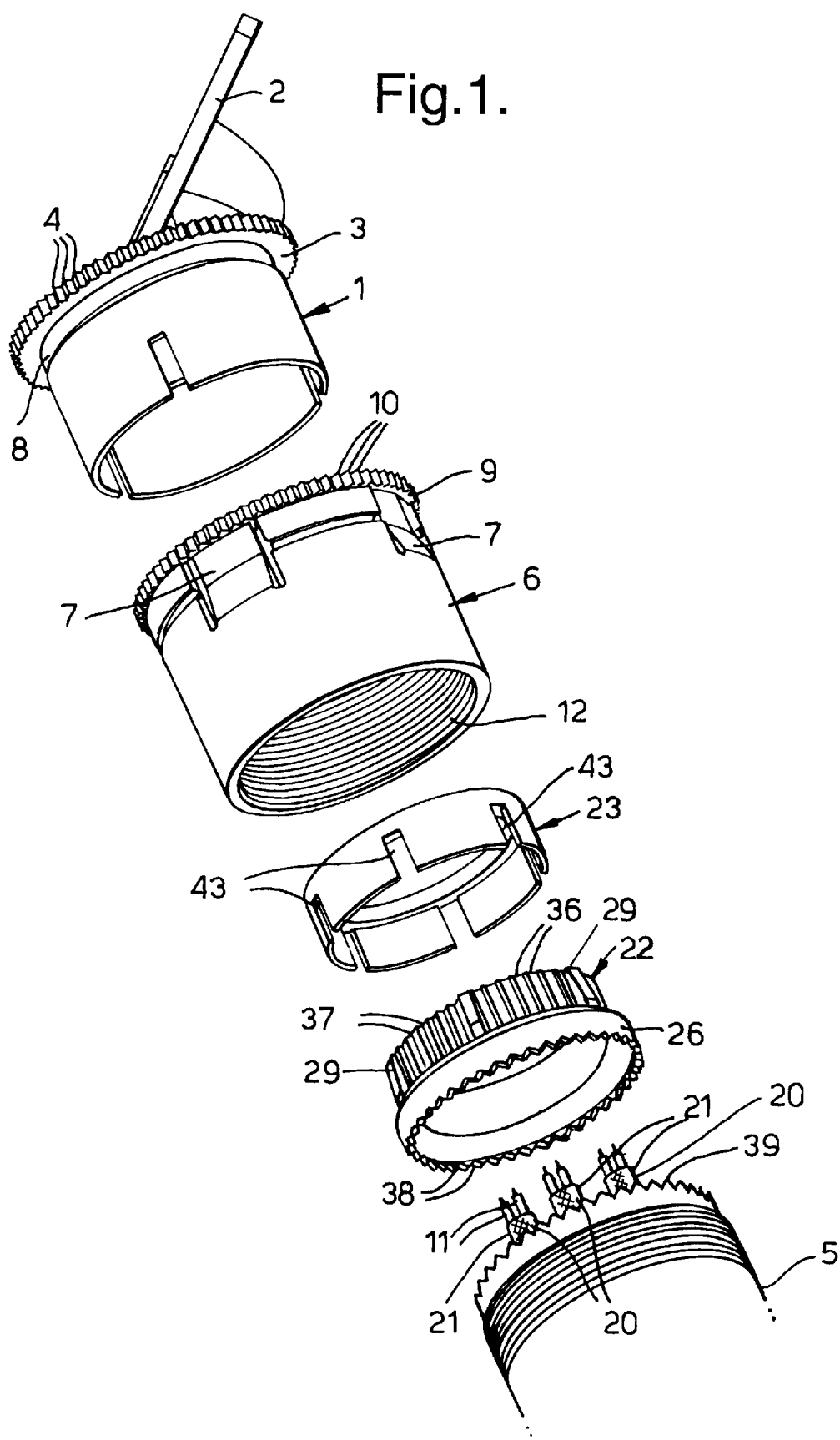

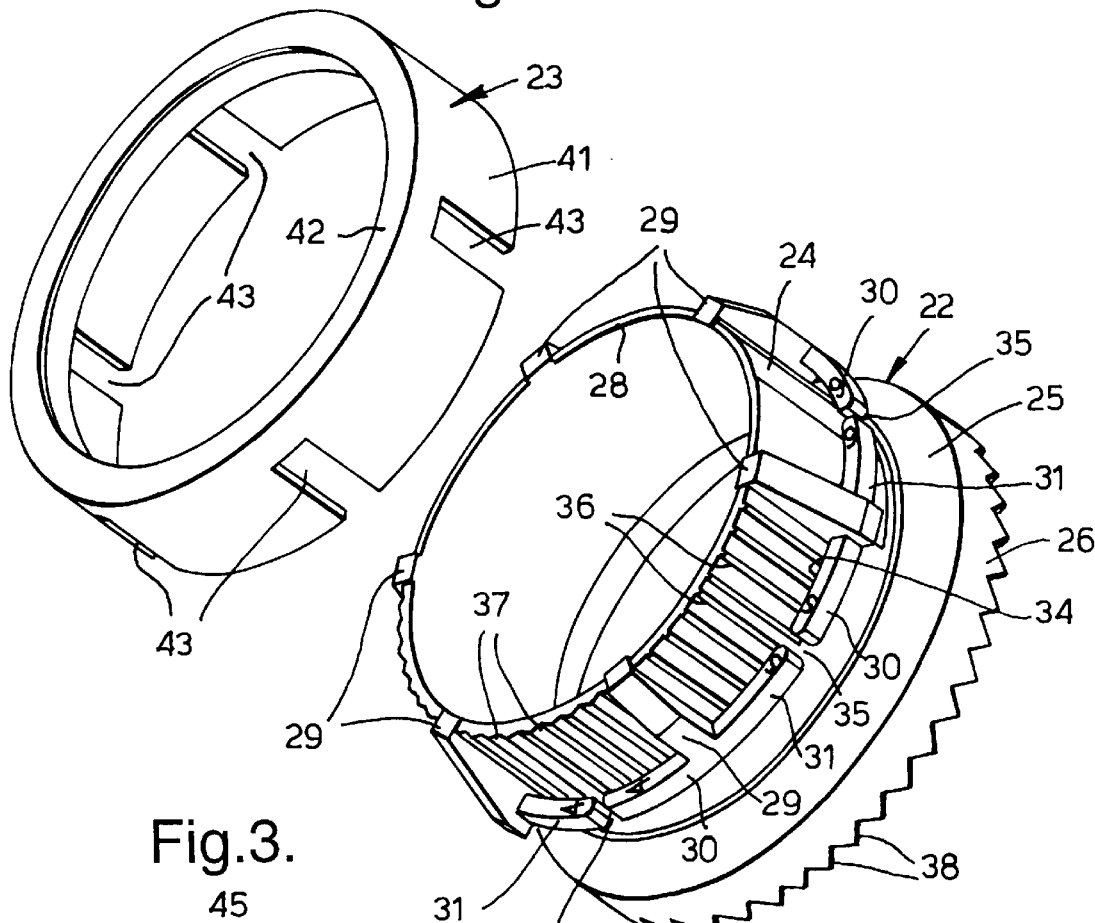
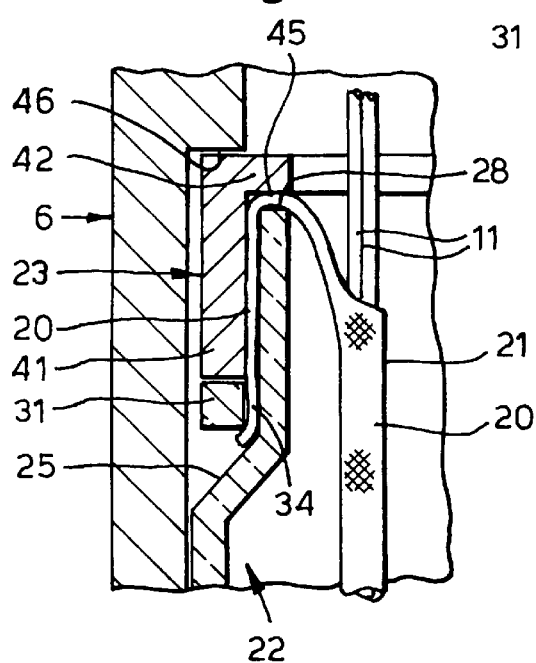

ELECTRICAL CONNECTION AND COUPLINGS

BACKGROUND OF THE INVENTION

This invention relates to electrical connection and couplings.

The invention is more particularly concerned with connections between the screening sleeve of electrical wires and the outer shell of a connector, coupling or the like.

It is becoming increasingly necessary for individual wires, or twisted pairs of wires, in a cable to be electrically screened from one another, because of the need for cables to handle high frequency and digital signals. The usual way in which wires are screened from one another within a multi-wire cable is by means of a braided sleeve extending around twisted pairs of the wires. The braided sleeves are electrically connected at opposite ends of the cable to a coupling or connector shell, which makes connection to a ground plane. One way in which the screening sleeves can be electrically connected with the outer shell is by trapping the ends of the sleeve between two nested metal cones, in the manner described in GB2256097. The problem with these cone arrangements is that it can be difficult to ensure that each braid is contacted with the same force. The filaments of one braid may be laid in a thicker configuration than filaments of another braid, so that the force exerted by the cones on the thicker braid is greater, giving a good electrical contact but possibly causing damage to the filaments of the thicker braid, and giving a poorer electrical contact with the thinner braid.

Various other arrangements have been proposed for making connection to screening sleeves of multiple wires in a cable but these suffer from various problems such as requiring increased space and difficulty of assembly and maintenance.

SUMMARY OF THE INVENTION

It is an object of the present invention to provide an improved electrical connection and coupling.

According to one aspect of the present invention there is provided an electrical coupling for making connection to screening sleeves of a plurality of screened signal wires, the coupling including an annular member having at least one resilient member extending around a part of an outer surface of the annular member so that the screening sleeves of screened wires extending through the annular member can be folded around one end of the annular member to extend back along its outer surface and retained by the resilient member.

The annular member preferably includes a plurality of the resilient members, each resilient member being arranged to retain different ones of the screening sleeves. Each resilient member is preferably a spring arm curved around the outer surface of the annular member. One end of the annular member may form an electrical contact surface for the screening sleeves, the screening sleeves being held against the contact surface by engagement with a cooperating member. The cooperating member is preferably an electrically-conductive cap having an outer sleeve arranged to extend around the outside of the annular member to protect the screening sleeves, and an inwardly-extending rim arranged to hold the screening sleeves against the contact surface of the annular member. The cap and the annular member may be arranged so that there is a gap between the rim and the contact surface sufficient to prevent damage to the screening sleeves. The annular member may have a plurality of radially-projecting splines around its surface, some at least of the splines projecting beyond the contact surface to engage the rim of the cap and thereby form the gap. Each spline preferably supports two resilient members extending around the annular member on opposite sides of the spline. The cap may have a plurality of slots around one end to locate with respective ones of the splines. The annular member may have a plurality of grooves formed around its outer surface to locate the screening sleeves. The annular member is preferably formed of a plastics material coated with a layer of metal. The annular member may have anti-rotation teeth around its opposite end arranged to engage teeth on a body member. The coupling preferably includes a collar arranged to extend around the annular member, the collar having a screw thread on its inner surface arranged to engage a screw thread on the outer surface of the body member, the collar being arranged to hold the annular member in contact with the body member.

According to another aspect of the invention there is provided an electrical connection comprising an annular member and a plurality of screened signal wires extending through the annular member, the annular member having at least one resilient member extending around a part of an outer surface of the annular member, the screening sleeves of the screened wires being folded around one end of the annular member to extend back along its outer surface, and the screening sleeves being retained by the resilient member.

An electrical coupling according to the present invention, will now be described, by way of example, with reference to the accompanying drawings.

BRIEF DESCRIPTION OF THE DRAWINGS

FIG. 1 is a perspective view of the coupling showing the components of the coupling separated from one another;

FIG. 2 is a perspective view of a part of the coupling to a greater scale showing the components separated; and FIG. 3 is a sectional side elevation view through a part of the coupling in an assembled state.

DETAILED DESCRIPTION OF THE PREFERRED EMBODIMENT

The electrical coupling is not shown fully in the drawings since only parts of the coupling necessary for an understanding of the invention need be described. The forward, upper component 1 shown in FIG. 1 is a short, tubular, metal end body of open construction having an angled support 2 at its upper end. A flange 3 projects radially outwards around the upper end of body 1, the flange having a series of teeth 4 around its circumference. The external diameter of the body 1 is such that it can extend telescopically within the forward end of a metal collar 6. The collar 6 has several spring clips 7 around its upper end, which clip onto a groove 8 formed just below the flange 3 on the body 1. The collar 6 also has a similar flange 9 formed with teeth 10 projecting radially outwardly around its upper end. When the body 1 is nested within the collar 6, the two flanges 3 and 9 are closely spaced from one another and have the same external diameter. The collar 6 is locked against rotation relative to the body 1 by means of an internally-splined locking ring, not shown, that can be slid along the coupling between a rear, unlocked position and a forward, locked position. The operation of this locking ring is described in greater detail in GB 2270805. A thread 12 is formed around the inside of the collar 6 at its lower, rear end so that the collar can be screwed onto a rear metal body 5 of the coupling. As so far described, the coupling is conventional.

The coupling includes a novel arrangement for making electrical connection of the screening sleeves 20 of up to twelve twisted-pair screened wires 21, only three of which are shown. The arrangement comprises an annular ring 22 and a cap 23, which are received within the rear, lower end of the collar 6. The ring 22 is preferably molded from a rigid plastics material coated with a metal or other electrically-conductive material so that at least the outer surfaces of the member are electrically conductive. Alternatively, the ring could be made entirely of metal.

The ring 22 has a forward, upper region 24 (FIG. 2) of cylindrical shape and constant internal diameter, an intermediate, outwardly flared region 25, and a rear, lower region 26 of cylindrical shape. The forward end of the forward region 24 has a flat annular contact surface 28 divided into six equal segments by six splines 29, which project radially outwardly around the surface of the region. The splines 29 are integrally molded with the ring 22 and each extend longitudinally a short distance forwardly of the contact surface 28. The forward end of the splines 29 are tapered outwardly towards their lower end where each spline supports two integral resilient members 30 and 31 in the form of spring arms extending circumferentially and curved to follow the curvature of the outer surface of the ring 22 in its forward region 24. The spring arms 30 and 31 are spaced above the outer surface of the forward region 24 by a small gap 34 sufficient to receive and resiliently retain the screening sleeves 20 of three of the wires 21 side-by-side. The spring arms 30 and 31 of adjacent splines 29 are spaced from one another by a small gap 35 sufficient to allow the screening sleeves 20 to be threaded under the spring arms. Between the splines 29, the external surface of the forward region 24 of the ring 22 may be smooth or may be interrupted by longitudinal, parallel grooves and ribs so as to locate the screening sleeves 20. These grooves and ribs may be of rectangular section, as shown at 36, or of triangular section, as shown at 37.

The rear region 26 is shorter than the forward region 24 and is formed around its lower end with a series of anti-rotation teeth 38 arranged to mate with cooperating teeth 39 on the rear body 5.

The arrangement by which connection is made to the screening sleeves 20 is completed by the cap 23, which is of an open, circular shape and is made of a metal or a plastics material coated with an electrically-conductive layer. The cap 23 comprises a short cylindrical sleeve 41 with a narrow, internally-projecting rim 42 at its forward end. Six slots 43 extend longitudinally from the rear end of the sleeve 41 to receive the splines 29 on the ring 22. The dimensions of the cap 23 are such that it is a close sliding fit on the forward end of the ring 22 when the screening sleeves 20 are in position. The braided screening sleeve 20 of each wire 21 is peeled away from its insulated signal conductor 11 and is folded over the forward end contact surface 28 of the ring 22 and down its outside. The screening sleeves 20 are pushed into the gap 35 between the spring arms 30 and 31 and moved sideways under the arms, with each arm retaining three of the twelve sleeves. The underside of the rim 42 abuts the forward ends of the splines 29, forming a stop limiting how far the cap 23 can be pushed onto the ring. This ensures that there is a small gap 45 (FIG. 3) between the contact surface 28 on the ring 22 and the underside of the rim 42. The size of the gap 45 is so selected that the screening sleeves 20 make a firm electrical contact with the contact surface 28 and the rim 42 but cannot be severed or damaged. When pushed fully onto the ring, the lower end of the sleeve 41 is spaced just forwardly of the forward surface of the spring arms 30 and 31.

The cap 23 is retained by friction on the ring 22 during installation, when the assembly of the cap and ring, with the screening sleeves 20 trapped between them, is pushed into the lower end of the collar 6. The cap protects the filaments of the screening sleeves 20 from damage during insertion into the collar 6. The collar 6 is screwed onto the rear body 5 so that the lower end 26 of the ring 22 abuts the forward end of the rear body and their teeth 38 and 39 engage to prevent relative rotation between the two parts. The upper edge of the cap 23 abuts a ledge 46 (FIG. 3) around the inside of the collar 6, the cap being held firmly against the collar once the collar is secured on the rear body 5. This establishes a low resistance connection between the screening sleeves 20 and the conductive outer parts of the coupling so that the screening sleeves are effectively grounded once the coupling is connected to a ground plane.

The connection provided by the present invention has advantages over previous arrangements for making connection to screening sleeves in that there is a low risk of damage to the screening filaments, there is very effective connection to all the screening sleeves in a multi-wire cable and the screening sleeves and signal wires can be readily accessible for repair and maintenance.

What I claim is:

1. An electrical coupling for making connection to screening sleeves of a plurality of screened signal wires, wherein the coupling comprises an annular member, said annular member having at least one resilient member in the form of a spring arm curved around a part of an outer surface of said annular member so that said screening sleeves of said screened wires extending through said annular member can be folded around one end of said annular member to extend back along its outer surface and can be retained by said resilient member.

2. An electrical coupling according to claim 1, further including a plurality of said resilient members, and wherein each said resilient member is arranged to retain different ones of said screening sleeves.

3. An electrical coupling according to claim 1, further including a cooperating member arranged to be mounted with said annular member, wherein one end of said annular member forms an electrical contact surface for said screening sleeves, and wherein said cooperating member holds said screening sleeves against said contact surface.

4. An electrical coupling according to claim 3, wherein said cooperating member is an electrically-conductive annular cap, and wherein said cap has an outer sleeve arranged to extend around an outside of said annular member to protect said screening sleeves, and an inwardly-extending rim arranged to hold said screening sleeves against said contact surface of said annular member.

5. An electrical coupling according to claim 4, wherein said cap and said annular member are arranged so that there is a gap between said rim and said contact surface sufficient to prevent damage to said screening sleeves.

6. An electrical coupling according to claim 5, wherein said annular member has a plurality of radially-projecting splines around its surface, and wherein at least some said splines project beyond said contact surface to engage the said rim of said cap and thereby form said gap.

7. An electrical coupling according to claim 6, wherein each said spline supports two of said resilient members extending around said annular member on opposite sides of said spline.

8. An electrical coupling according to claim 6, wherein said cap has a plurality of slots around one end to locate respective ones of said splines.

9. An electrical coupling according to claim 1, wherein said annular member has a plurality of grooves formed around its outer surface to locate said screening sleeves.

10. An electrical coupling according to claim 1, wherein said annular member is formed of a plastics material coated with a layer of metal.

11. An electrical coupling according to claim 1, further including a body member, said body member having anti-rotation teeth at one end, and wherein said annular member has anti-rotation teeth around an end opposite said one end, said teeth on said annular member being arranged to engage said teeth on said body member.

12. An electrical coupling according to claim 11, further including a collar arranged to extend around said annular member, wherein the collar has a screw thread on its inner surface, wherein said body member has a screw thread on an outer surface, and wherein said screw thread on said collar is arranged to engage said screw thread on said body member so as to hold said annular member in contact with said body member.

13. An electrical coupling for making connection to screening sleeves of a plurality of screened signal wires, wherein the coupling comprises: an annular member, said annular member having a plurality of integral curved spring arms extending around a part of an outer surface of said annular member, and a contact surface at one end; and an electrically-conductive cap arranged to fit over said one end of said annular member so that said screening sleeves of said screened wires extending through the annular member can be folded around said contact surface to extend back along an outer surface of said annular member and extend under one of said spring arms, and are protected within said cap.

14. An electrical coupling according to claim 13, further including a body member and a collar, wherein said body member and said annular member have cooperating surface formations that engage and prevent relative rotation therebetween, and wherein said collar is arranged to extend over said cap and said annular member and to engage said body member so as to hold said cap onto said annular member and to hold said surface formations on said annular member and said body member in contact with one another.

* * * * *